US008423415B2

(12) United States Patent
Sahota et al.

(10) Patent No.: US 8,423,415 B2
(45) Date of Patent: *Apr. 16, 2013

(54) PAYMENT SERVICE AUTHENTICATION FOR A TRANSACTION USING A GENERATED DYNAMIC VERIFICATION VALUE

(75) Inventors: Jagdeep Singh Sahota, Rodeo, CA (US); Christian Aabye, Foster City, CA (US)

(73) Assignee: Visa International Service Association, Foster City, CA (US)

( * ) Notice: Subject to any disclaimer, the term of this patent is extended or adjusted under 35 U.S.C. 154(b) by 98 days.

This patent is subject to a terminal disclaimer.

(21) Appl. No.: 12/819,811

(22) Filed: Jun. 21, 2010

(65) Prior Publication Data

US 2010/0262546 A1    Oct. 14, 2010

Related U.S. Application Data

(62) Division of application No. 10/642,878, filed on Aug. 18, 2003, now Pat. No. 7,761,374.

(51) Int. Cl.
*G06Q 40/00* (2006.01)
(52) U.S. Cl.
USPC .................................. 705/16; 705/17; 705/18
(58) Field of Classification Search ...................... 705/16
See application file for complete search history.

(56) References Cited

U.S. PATENT DOCUMENTS

| 4,528,442 | A | 7/1985 | Endo |
| 5,254,843 | A | 10/1993 | Hynes et al. |
| 5,311,594 | A | 5/1994 | Penzias |
| 5,434,398 | A | 7/1995 | Goldberg |
| 5,465,387 | A | 11/1995 | Mukherjee |
| 5,513,250 | A | 4/1996 | McAllister |
| 5,577,121 | A | 11/1996 | Davis et al. |
| 5,625,689 | A | 4/1997 | Indeck et al. |

(Continued)

FOREIGN PATENT DOCUMENTS

| JP | 2000298733 A | 10/2000 |
| JP | 2007517272 | 6/2007 |

(Continued)

OTHER PUBLICATIONS

International Search Report from PCT/US04/26813, May 7, 2007.

(Continued)

*Primary Examiner* — Shahid Merchant
*Assistant Examiner* — Arunava Chakravarti
(74) *Attorney, Agent, or Firm* — Kilpatrick Townsend & Stockton LLP

(57) ABSTRACT

Methods and systems for dynamically generating a verification value for a transaction and for utilizing such value to verify the authenticity of the payment service application. The dynamically created verification value may be generated on a payment device, such as an integrated circuit credit card or smart card, embedded into the payment data, and transmitted to a point of sale terminal. Alternatively, payment data is sent by a payment device to a point of sale terminal, which generates a verification value and embeds it into the payment data. The embedded verification value is used by a service provider to verify the authenticity of the transaction. The methods and systems may be used in a contactless (wireless) environment or a non-wireless environment.

17 Claims, 7 Drawing Sheets

U.S. PATENT DOCUMENTS

| | | | |
|---|---|---|---|
| 5,627,355 | A | 5/1997 | Rahman et al. |
| 5,708,422 | A | 1/1998 | Blonder et al. |
| 5,737,421 | A | 4/1998 | Audebert |
| 5,740,244 | A | 4/1998 | Indeck et al. |
| 5,774,525 | A | 6/1998 | Kanevsky et al. |
| 5,802,176 | A | 9/1998 | Audebert |
| 5,819,226 | A | 10/1998 | Gopinathan et al. |
| 5,832,458 | A | 11/1998 | Jones |
| 5,834,747 | A | 11/1998 | Cooper |
| 5,835,599 | A | 11/1998 | Buer |
| 5,872,834 | A | 2/1999 | Teitelbaum |
| 5,878,337 | A | 3/1999 | Joao et al. |
| 5,903,830 | A | 5/1999 | Joao et al. |
| 5,914,471 | A | 6/1999 | Van De Pavert |
| 5,914,472 | A | 6/1999 | Foladare et al. |
| 5,920,628 | A | 7/1999 | Indeck et al. |
| 5,988,497 | A | 11/1999 | Wallace |
| 6,012,144 | A | 1/2000 | Pickett |
| 6,029,154 | A | 2/2000 | Pettitt |
| 6,112,191 | A | 8/2000 | Burke |
| 6,157,707 | A | 12/2000 | Baulier et al. |
| 6,219,793 | B1 | 4/2001 | Li et al. |
| 6,234,901 | B1 | 5/2001 | Nagoshi et al. |
| 6,260,146 | B1 | 7/2001 | Mos et al. |
| 6,308,890 | B1 | 10/2001 | Cooper |
| 6,442,532 | B1 | 8/2002 | Kawan |
| 6,529,725 | B1 | 3/2003 | Joao et al. |
| 6,612,488 | B2 | 9/2003 | Suzuki |
| 6,714,918 | B2 | 3/2004 | Deshpande et al. |
| 6,832,721 | B2 | 12/2004 | Fujii |
| 6,899,269 | B1 | 5/2005 | Deland |
| 6,904,526 | B1 | 6/2005 | Hongwei |
| 6,913,194 | B2 | 7/2005 | Suzuki |
| 7,003,497 | B2 | 2/2006 | Maes |
| 7,024,396 | B2 | 4/2006 | Woodward |
| 7,044,394 | B2 | 5/2006 | Brown |
| 7,051,002 | B2 | 5/2006 | Keresman, III et al. |
| 7,096,003 | B2 | 8/2006 | Joao et al. |
| 7,143,095 | B2 | 11/2006 | Barrett et al. |
| 7,761,374 | B2 | 7/2010 | Sahota et al. |
| 7,899,753 | B1 | 3/2011 | Everhart |
| 2001/0037453 | A1* | 11/2001 | Mitty et al. ............ 713/168 |
| 2002/0002681 | A1 | 1/2002 | Kawano et al. |
| 2002/0049818 | A1* | 4/2002 | Gilhuly et al. ............ 709/206 |
| 2002/0091562 | A1 | 7/2002 | Siegel et al. |
| 2002/0096570 | A1 | 7/2002 | Wong et al. |
| 2002/0108062 | A1 | 8/2002 | Nakajima et al. |
| 2002/0116341 | A1* | 8/2002 | Hogan et al. ............ 705/64 |
| 2002/0123792 | A1* | 9/2002 | Burgermeister ............ 623/1.15 |
| 2002/0123972 | A1* | 9/2002 | Hodgson et al. ............ 705/72 |
| 2002/0133462 | A1 | 9/2002 | Shteyn |
| 2002/0147658 | A1* | 10/2002 | Kwan ............ 705/26 |
| 2002/0153424 | A1 | 10/2002 | Li |
| 2002/0158747 | A1 | 10/2002 | McGregor et al. |
| 2002/0180584 | A1 | 12/2002 | McGregor et al. |
| 2003/0105964 | A1 | 6/2003 | Brainard et al. |
| 2003/0208684 | A1 | 11/2003 | Camacho et al. |
| 2004/0107170 | A1 | 6/2004 | Labrou et al. |
| 2004/0171406 | A1 | 9/2004 | Purk |
| 2004/0185830 | A1 | 9/2004 | Joao et al. |
| 2005/0043997 | A1 | 2/2005 | Sahota et al. |
| 2005/0080730 | A1 | 4/2005 | Sorrentino |
| 2005/0170814 | A1 | 8/2005 | Joao et al. |
| 2005/0171905 | A1 | 8/2005 | Wankmueller et al. |
| 2006/0059110 | A1 | 3/2006 | Madhok et al. |
| 2006/0202025 | A1 | 9/2006 | Calabrese et al. |
| 2006/0281439 | A1 | 12/2006 | Benco et al. |
| 2006/0282382 | A1 | 12/2006 | Balasubramanian et al. |
| 2006/0287955 | A1 | 12/2006 | Moulart et al. |
| 2006/0290501 | A1 | 12/2006 | Hammad et al. |
| 2006/0293027 | A1 | 12/2006 | Hammad et al. |
| 2007/0294182 | A1 | 12/2007 | Hammad |
| 2008/0005037 | A1 | 1/2008 | Hammad et al. |
| 2008/0029593 | A1 | 2/2008 | Hammad et al. |
| 2008/0034221 | A1 | 2/2008 | Hammad et al. |
| 2008/0040271 | A1 | 2/2008 | Hammad et al. |
| 2008/0040276 | A1 | 2/2008 | Hammad et al. |
| 2008/0065553 | A1 | 3/2008 | Faith et al. |
| 2008/0103982 | A1 | 5/2008 | Hammad et al. |
| 2008/0120236 | A1 | 5/2008 | Faith et al. |
| 2008/0302876 | A1 | 12/2008 | Mullen |
| 2009/0055892 | A1 | 2/2009 | Lu et al. |
| 2009/0055893 | A1 | 2/2009 | Manessis et al. |
| 2010/0252623 | A1 | 10/2010 | Hammad et al. |
| 2010/0262546 | A1 | 10/2010 | Sahota et al. |

FOREIGN PATENT DOCUMENTS

| | | |
|---|---|---|
| WO | 03/081832 A2 | 10/2003 |
| WO | WO 2005/001635 A2 | 1/2005 |
| WO | WO 2005/001635 A3 | 1/2005 |

OTHER PUBLICATIONS

Written Opinion of the International Searching Authority from PCT/US04/26813, May 7, 2007.

International Preliminary Report on Patentability from PCT/US04/26813, May 30, 2007.

Decision to Grant from JP 2006-524010 dated Mar. 29, 2011.

* cited by examiner

PAYMENT SERVICE AUTHENTICATION FOR A TRANSACTION USING A GENERATED DYNAMIC VERIFICATION VALUE

CROSS-REFERENCE TO RELATED APPLICATIONS

This is a divisional application of U.S. application Ser. No. 10/642,878, filed on Aug. 18, 2003, now U.S. Pat. No. 7,761,374 titled "Method And System For Generating A Dynamic Verification Value," which is incorporated herein by reference.

BACKGROUND

As methods and devices for engaging in financial transactions have increased and expanded into new horizons, age old problems such as fraud and counterfeiting persist. In fact, as applications and devices are developed which make credit or debit based transactions a more attractive and readily available alternative to cash, fraud and counterfeiting activities have seen a proportionate increase.

In order to protect financial institutions, consumers and merchants from the fraudulent use of transaction cards, the industry has developed and introduced many features designed to reduce fraud and counterfeiting such as holograms, special over-layers, and watermarks. Nonetheless, many of these features are proving to be less effective as financial transactions are increasingly being conducted in a wireless environment. Similarly, as financial instruments are increasingly being employed on electronic devices, rather than physical plastic cards, the ability to use techniques such as a customer signature or holograms to verify a party to a transaction is becoming less available.

One of the primary sources of fraud which is prevalent in the credit card industry is skimming, which refers to the electronic copying of the card's magnetic stripe data to create counterfeit cards. Early skimming was difficult to hide and required cumbersome equipment. As credit card technology has become more sophisticated, so has the technology used by skimmers.

In addition, new forms of skimming have appeared. For example, in one instance a small bug was implanted in a terminal, and left in place for weeks to collect hundreds of card numbers before being removed to harvest the collective card data. Also, one of the more insidious forms of skimming involved line tapping wherein the communication lines between the terminal and the credit card issuer is tapped and the card data extracted from the communications string. One of the most sophisticated examples of line tapping involved skimmers renting an office next to an issuers regional data center and tapping lines going to the issuer computers. The tapped lines were redirected through a computer on the skimmer's site. Compounding the problem, the skimmers were able to remotely access their computer thus permitting the skimmers to harvest the credit card numbers from a remote location. By some estimates, skimming costs financial institutions hundreds of billions of dollars annually. Furthermore, some industry analysts have estimated that each skimmed card will engage in at least $2,000 in transactions before the fraud is uncovered.

Skimming is predominantly a phenomenon afflicting magnetic stripe based transactions. This is because the magnetic stripe, which is placed on the back of a transaction card and stores a variety of data on three separate tracks, is a passive media. In other words, the digital content of the magnetic stripe can be perfectly copied, without any difference between the copy and the original. Largely, this feature is relied upon in legitimate magnetic stripe transactions as a point of sale terminal is simply required to read the data present on the magnetic stripe.

One of the primary means by which skimming can be prevented is for the consumer to closely monitor the whereabouts of their transaction card. This will allow the consumer to prevent the card from being swiped through inappropriate devices. However, as magnetic stripe contactless cards evolve and bring the promise of quick transactions to current payment environments, the classic skimming problem comes along with it. In fact, in a wireless environment the opportunity to skim magnetic stripe data is more prevalent. In a wireless environment, a potential skimmer need not physically possess the card to be skimmed nor have access to any of the physical equipment (e.g. POS terminal, communication lines, etc.) which is required for skimming in a wire based environment. A skimmer can simply, and without knowledge of the consumer or merchant, intercept the wireless transaction and copy the data being transmitted from the card to POS terminal.

Nonetheless, magnetic stripe data and magnetic stripe payment applications are increasingly being deployed on integrated circuit cards or similar devices which have processing capabilities. Accordingly, what is needed is to dynamically generate a verification value for each transaction which can be used to authenticate the transaction. Such an approach to authentication of the payment service will significantly reduce the opportunity for skimming since the verification value is different for each transaction. Therefore, even if the data utilized in a given transaction is skimmed, that data will not be useful in conducting further transactions since the skimmed verification value is not valid for subsequent transactions.

SUMMARY

The present invention describes a system and method for dynamically generating a verification value for verifying the authenticity of a payment service deployed on a payment device, such as an integrated circuit credit card, each time the payment service is utilized in a transaction. With each transaction, a verification value is dynamically generated on the payment device from data specific to the payment service. The verification value is embedded into the payment data which is transmitted from the payment device to a point of sale terminal such as a credit card terminal. The point of sale terminal transmits the payment data, with the embedded verification data, which may be in the form of magnetic stripe credit card Track 1 and/or Track 2 data, to a payment network which transmits the payment data to a service provider computer. The service provider computer independently generates a verification value. The transaction is disapproved if the service provider generated verification value does not match the payment device generated verification value.

In an alternate embodiment, payment data generated with each transaction on the payment device is transmitted from the payment device on which the payment data was generated to a point of sale terminal such as a credit card terminal. A verification value may be generated by the point of sale terminal using the payment data and information contained within the point of sale device. The point of sale terminal transmits the payment data, with the verification data, which may be in the form of magnetic stripe credit card Track 1 and/or Track 2 data, to a payment network which transmits the payment data to a service provider computer. The service provider computer independently generates a verification value. The transaction is disapproved if the service provider generated verification value does not match the verification value generated on the point of sale terminal.

The present invention may be used in any transaction in which magnetic stripe Track 1 and/or Track 2 data will be exchanged over any type of interface including contact-based interfaces and wireless interfaces.

BRIEF DESCRIPTION OF THE DRAWINGS

Aspects, features, benefits and advantages of the embodiments of the present invention will be apparent with regard to the following description, appended claims and accompanying drawings where:

DETAILED DESCRIPTION

Figure 1:
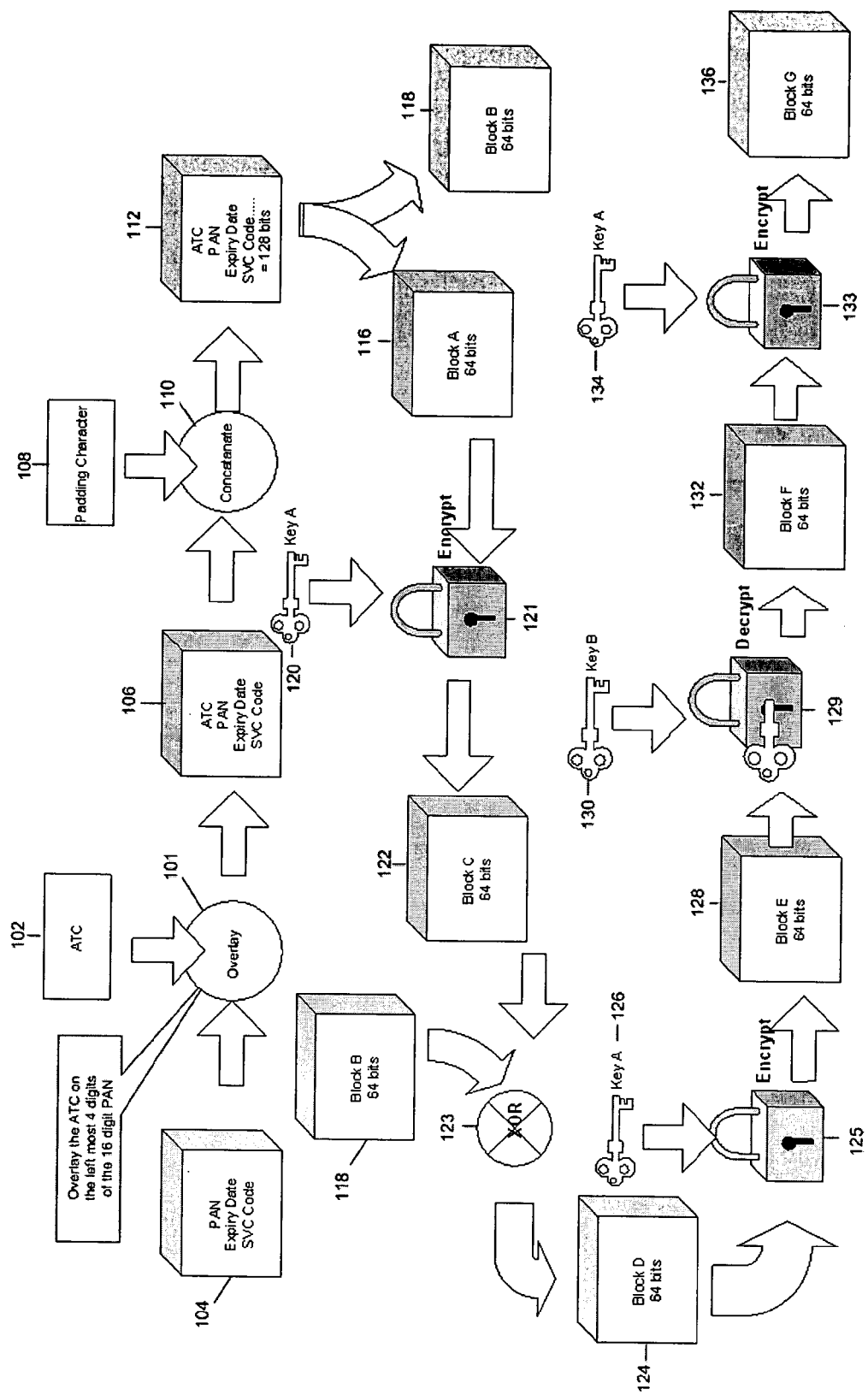
FIG. 1 depicts the method of creating an encrypted data block for use in the present invention.

Before the present methods are described, it is to be understood that this invention is not limited to the particular methodologies, devices or protocols described, as these may vary. It is also to be understood that the terminology used in the description is for the purpose of describing the particular versions or embodiments only, and is not intended to limit the scope of the present invention which will be limited only by the appended claims. In particular, although the present invention is described in conjunction with financial transactions, it will be appreciated that the present invention may find use in any electronic exchange of data.

It must also be noted that as used herein and in the appended claims, the singular forms "a", "an", and "the" include plural reference unless the context clearly dictates otherwise. Thus, for example, reference to a "key" is a reference to one or more keys and equivalents thereof known to those skilled in the art, and so forth. Unless defined otherwise, all technical and scientific terms used herein have the same meanings as commonly understood by one of ordinary skill in the art. Although any methods similar or equivalent to those described herein can be used in the practice or testing of embodiments of the present invention, the preferred methods are now described. All publications mentioned herein are incorporated by reference. Nothing herein is to be construed as an admission that the invention is not entitled to antedate such disclosure by virtue of prior invention.

Generally, the present invention provides methods and systems for dynamically generating a card verification value for each transaction and for utilizing such value to verify that the payment service is authentic and has not been skimmed. The dynamically generated Card Verification Value (referred to herein as the "dCVV") is generated on the payment device, embedded into the payment data, and transmitted to a point of sale terminal. In an alternate embodiment, payment data is received from a payment device, a verification value is generated by a point of sale terminal, and the verification value is embedded into the payment data.

In an embodiment, data received by the point of sale terminal is interpreted as simply payment data (e.g. standard magnetic stripe Track 1 and/or Track 2 data without an embedded dCVV) by the point of sale terminal. The point of sale terminal passes on the received data to a payment network which, in turn, passes the data on to the service provider. If the service provider determines the transaction is one for which a dCVV is required, the service provider independently generates a verification value. If the verification value generated by the service provider does not match the dCVV received from the payment device, the transaction is identified as potentially fraudulent and disapproved.

In an alternate embodiment, data is received by the point of sale terminal and is used by the point of sale terminal to generate a verification value. The point of sale terminal passes on the received data to a payment network which, in turn, passes the data on to the service provider. The service provider independently generates a verification value. If the verification value generated by the service provider does not match the dCVV received from the point of sale terminal, the transaction is identified as potentially fraudulent and disapproved.

For purposes of this application, the term "payment device" shall mean any device comprising a microprocessor which may be used in a transaction or data exchange as described herein. Without limiting the generality of the foregoing, "payment device" shall include an integrated circuit card (also commonly known as a smartcard), a memory card, a cellular telephone, a personal digital assistant, a mobile electronic device, or a computer.

For purposes of this application, "contactless" or "wireless" shall mean any communications method or protocol, including proprietary protocols, in which data is exchanged between two devices without the need for the devices to be physically coupled. Without limiting the generality of the foregoing, "contactless" or "wireless" shall include data transmissions by laser, radio frequency, infrared communications, Bluetooth, or wireless local area network.

For purposes of this application, the term "payment service" shall mean any application deployed on a payment device which causes the exchange of data between the payment device and any other device or location. It should be appreciated that "payment service" is not limited to financial applications.

For purposes of this application, "payment data" shall mean, with respect to financial applications those data elements used by the payment service to execute a transaction, and with respect to non-financial transactions any necessary data elements exclusive of the present invention. For example, when the payment service is a magnetic stripe credit card transaction, "payment data" would comprise Track 1 and/or Track 2 data, as that is understood by one of ordinary skill in the credit card industry, such as the primary account number, expiration date, service codes, and discretionary data. "Payment data" may also comprise a unique card identification number or a unique identification number for a service provider.

In an embodiment, the payment data will reside on memory located on the payment device. The payment device will also maintain an application transaction counter (ATC). The ATC will initially be set by the service provider to a predetermined value. Thereafter, the ATC will be incremented with each transaction. Alternately, the ATC may be decremented from its initial predetermined value with each transaction. The ATC may be a value of any length. In addition, the service provider which deployed the payment service will maintain a corresponding ATC accessible to the service provider's computer. As discussed in more detail below, this corresponding ATC is used to identify payment services which may have been skimmed. In an alternate embodiment, a cryptogram, digital signature, or hash value based on transaction data may be used in place of or in conjunction with the ATC.

Each time the payment service is initiated, a dCVV is generated on the payment device for authentication purposes. FIG. 1 depicts the method of generating a dCVV for each transaction according to the present invention. Initially, a numeric string of predetermined length is created. This numeric string is created by overlaying 101 the ATC 102 over the corresponding leftmost digits of the account number for the payment service or PAN 104. This numeric string is concatenated on the right with the expiration date for the payment service and the service code to produce a concatenated value 106. If necessary, padding characters 108 are concatenated 110 on the right of the concatenated value 106 to form a numeric string 112 with a predetermined fixed length. In a preferred embodiment, this numeric string 112 is 128-bits in length, although a numeric string of any length may be used. The padding characters 108 may consist of a stream of 0's, 1's, or any other numeric value that is known both to the payment device and the service provider. The numeric string 112 is bisected into two blocks of equal length, Block A 116 and Block B 118. Block A 116 is then encrypted 121 with a first encryption key 120. The result of the encryption step 121 is Block C 122 of length equal to Block A 116. Block C 122 is then exclusively OR'ed (XOR) 123 with Block B 118 resulting in Block D 124. Block D 124 is then encrypted 125 with a second encryption key 126 to produce Block E 128. Block E 128 is then decrypted 129 using a decryption key 130 to produce Block F 132. Block F 132 is then encrypted 133 using a fourth encryption key 134 to produce Block G 136.

It will be apparent to one of ordinary still in the art that the first encryption key 120, the second encryption key 126, the third encryption key 130 and the fourth encryption key 134 may take any preselected value. In an embodiment of the present invention, the first encryption key 120, the second encryption key 126, and the fourth encryption key 134 are equivalent and of a different value from the third encryption key 130. Other permutations of the encryption key values utilized in the methodology of FIG. 1 are within the scope of the present invention.

Figure 2:
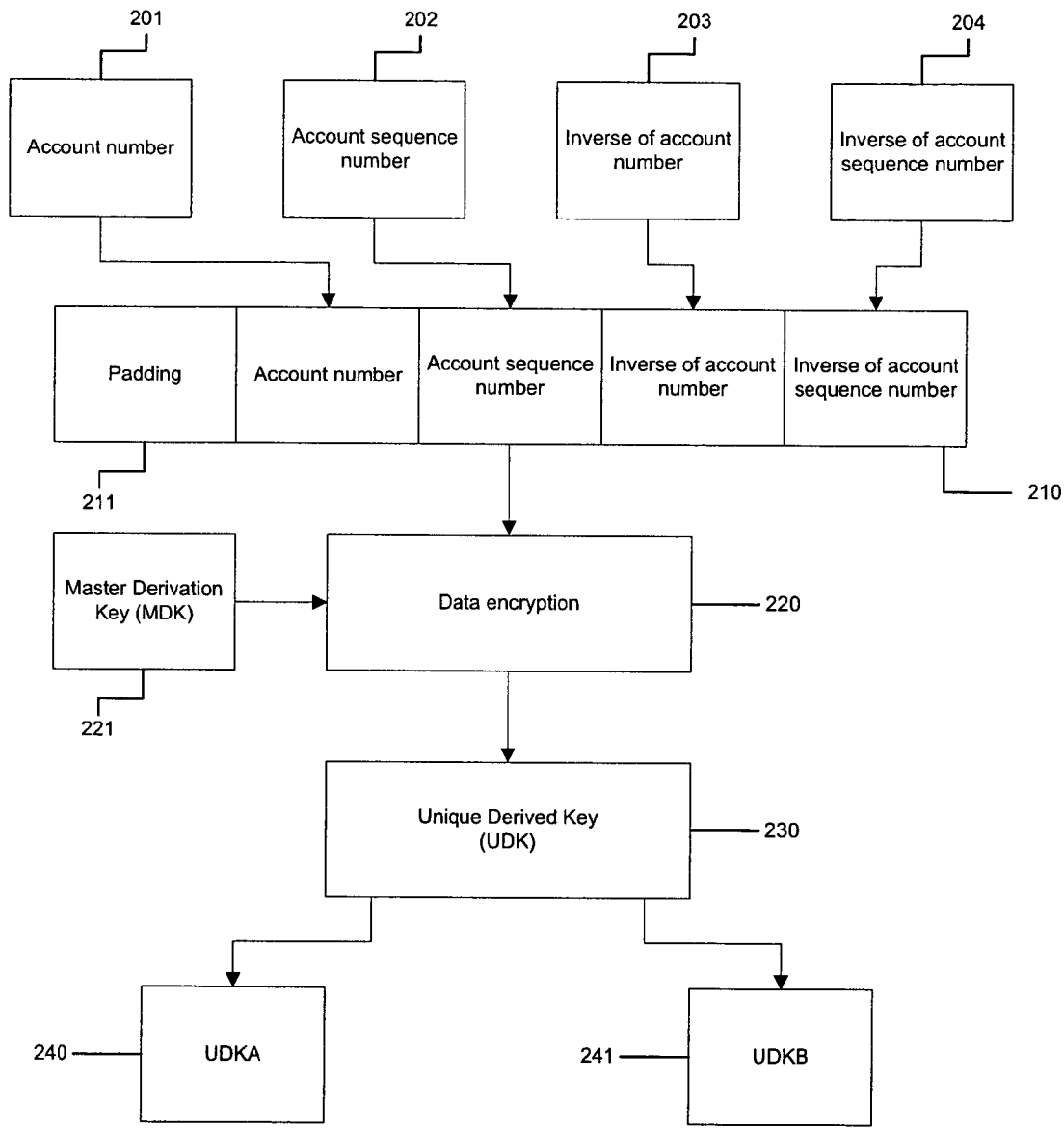
FIG. 2 depicts a method for generating unique derived keys from data residing on a payment device.

In a preferred embodiment, the first encryption key 120, the second encryption key 126, the third encryption key 130, and the fourth encryption key 134 take the value of unique keys derived from data existing on the payment device. Upon deployment, each payment service is personalized by the service provider with a master derivation key. The master derived key may be deployed with payment services in batches (i.e. multiple payment services receive the same master derived key) or individually. Each payment device will be personalized with the functionality to derive keys unique to the payment service. FIG. 2 shows the methodology for deriving two unique keys which are utilized in the preferred embodiment. The account number 201, the account sequence number 202, the inverse of the account number 203, and the inverse of the account sequence number 204 are concatenated together to create a concatenated value 210. If necessary, the concatenated value 210 may be padded with zeroes, or some other value 211, to create a string of a predetermined fixed length. In a preferred embodiment, the concatenated value 210 may be 128 bits in length, although the concatenated value is not limited to being this length. The concatenated value 210 is then encrypted 220 using the master derivation key 221 as the encryption key for each encryption stage. The encryption utilized may include any type of encryption methodology. For example, this encryption step may utilize Triple-DES encryption. The value resulting from the encryption step 220 is a unique derived key or UDK 230 for the application identified by the account number. Two additional keys, UDKA 240 and UDKB 241, are derived from the UDK. The derivation of UDKA 240 and UDKB 241 from the UDK 230 may take any form, including assigning the value of the leftmost half of the UDK 230 to UDKA 240, and assigning the value of the rightmost half of the UDK 230 to UDKB 241. Alternatively, the UDKA 240 may be derived by selecting alternating or other predetermined bit sequences from the UDK 230 while the remaining bits are assigned to UDKB 241. Furthermore, there is no requirement that UDKA 240 and UDKB 241 are of equal length.

Figure 3:
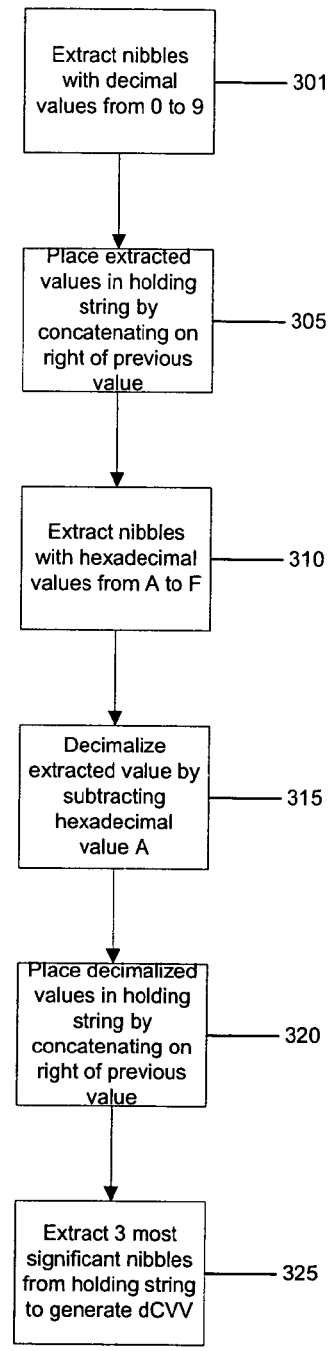
FIG. 3 depicts a method for extracting portions of an encrypted data block for creating a dynamic card verification value according to the present invention.

Returning now to the result of the methodology set forth in FIG. 1. FIG. 3 describes the further processing required to generate the dCVV. Each nibble (4-bit grouping) of the value stored in Block G 136 is subjected to two separate iterative processes to evaluate the value of each nibble. As shown in FIG. 3, beginning with the most significant (i.e. left most) digit of Block G 136 and examining each sequential nibble, if a nibble contains a value ranging from zero to nine, inclusive, that value is extracted 301 and placed in a new numeric string 305, referred to herein as a holding string, by concatenating the extracted value to the right of the previously extracted value, if any. The result will be that the holding string contains a series of values ranging from zero to nine, inclusive, which appear from left to right in the holding string in the same sequence in which they appear in Block G 136.

A second evaluation is then performed again beginning with the most significant digit of Block G 136 and examining each sequential nibble. If a nibble contains a hexadecimal value ranging from ten (A) to fifteen (F), inclusive, that value is extracted 310. The extracted value is then decimalized by subtracting the hexadecimal value A from the extracted value resulting in a decimalized value ranging from zero to five 315. This decimalized value is then concatenated on the right to the right most value of the holding string 320.

Once all nibbles in Block G have been twice examined as described, the three most-significant (i.e. leftmost) nibbles of the holding string are extracted 325. This 3-digit value is the dCVV for the transaction. Other numbers of bits may be extracted from the twice-examined nibble string to generate the dCVV for a transaction. Furthermore, different nibbles, such as the rightmost nibbles, may be used as the dCVV for a transaction. The three leftmost nibbles, however, represent a preferred embodiment.

Once generated, the dCVV is embedded into the payment data transmitted from the payment device to the point of sale terminal. The data received by the point of sale terminal will appear to the point of sale terminal as standard payment data. In other words, the point of sale terminal will not be able to determine if a dCVV is embedded and where such dCVV may be located. There is no indication to the point of sale terminal that a dCVV is embedded into the data received from the payment device.

Figure 4:
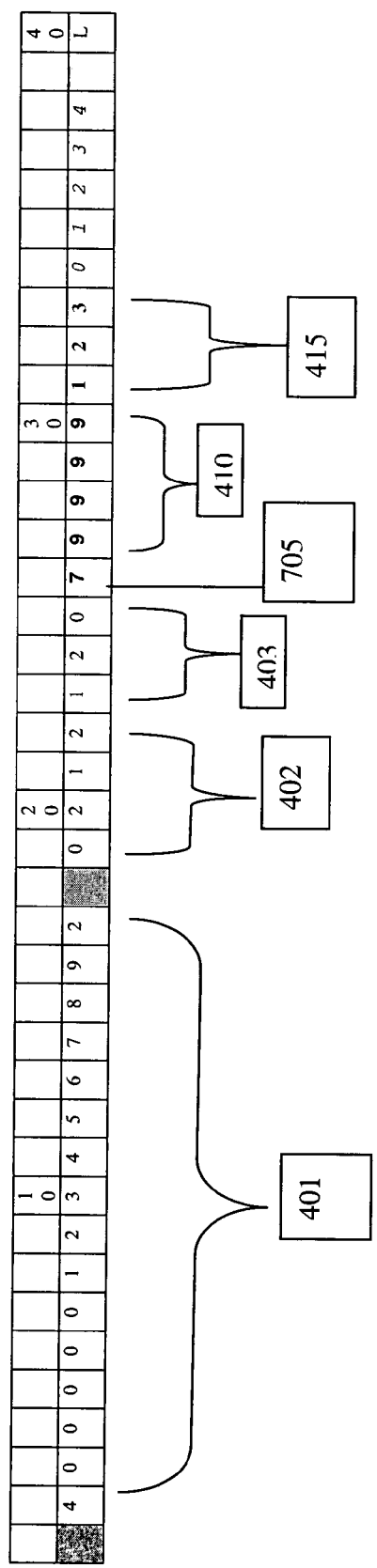
FIG. 4 depicts an exemplary record format for use in an embodiment of the present invention.

FIG. 4 depicts an exemplary record format for transmitting payment data, with the dCVV embedded therein, from the payment device to the point of sale terminal. The record format of FIG. 4 is created by concatenating a primary account number 401 for the payment service, with an expiration date 402, and a service code 403. In a preferred embodiment, the primary account number 401 is 16 digits long, the expiration date 402 is four digits long, and the service code 403 is three digits long. However, the primary account number 401, the expiration date 402, and the service code 403 are not limited to being these lengths. Next, in a field typically reserved for other uses, a value is placed as an indicator 405 that a dCVV has been embedded in this record. The value of this indicator is known by the service provider which deployed the application on the payment device. Next, the ATC 410 is placed in the field which may typically be reserved for PIN verification data. Finally, the dCVV 415 is concatenated on the right of the record. The remainder of the record may comprise additional discretionary data.

Figure 5:
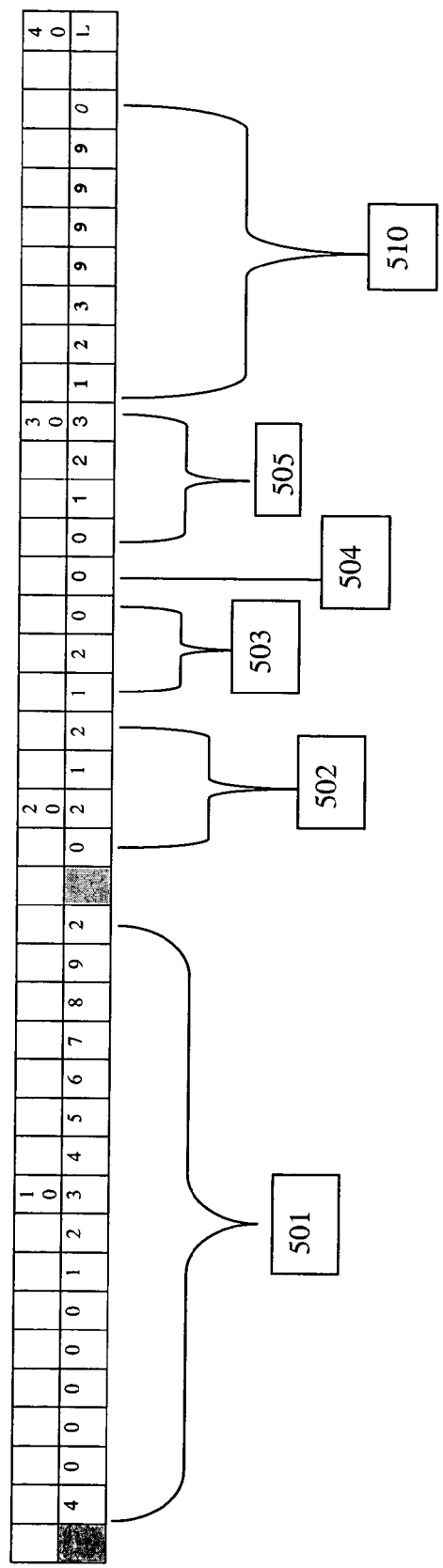
FIG. 5 depicts an alternative exemplary format for use in an embodiment of the present invention.

Alternately, FIG. 5 depicts a second exemplary format for transmitting payment information with the dCVV embedded thereon from the payment device to the point of sale terminal. The format in FIG. 5 is created by concatenating a primary account number 501 for the payment service, with an expiration date 502, a service code 503, a PVKI 504, and a field for PIN verification data 505. In a preferred embodiment, the primary account number 501 is sixteen digits long, the expiration date 502 is four digits long, the service code 503 is three digits long, the PVKI 504 is one digit long, and the PIN verification data 505 is four digits long. However, the primary account number 501, the expiration date 502, the service code 503, the PVKI 504, and the PIN verification data 505 are not limited to being these lengths. Next, in a single data field 510 each of the dynamically created CVV, the ATC and the indicator to be used by the service provider to identify that a dynamic CVV has been embedded are stored in sequence. The remainder of the record may comprise additional discretionary data.

Figure 6:
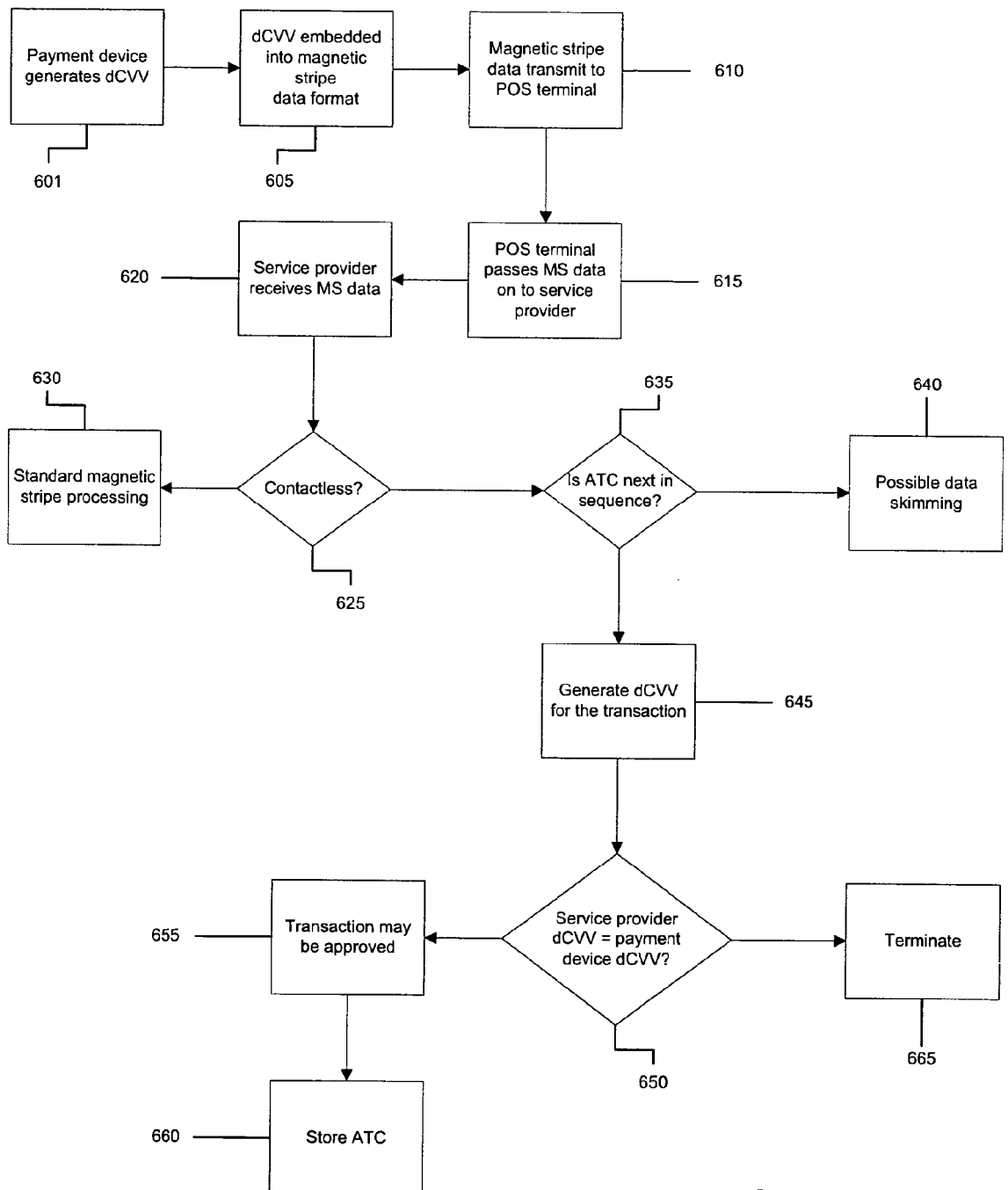
FIG. 6 is a flowchart of a preferred method of utilizing a dynamically created verification value to authenticate a transaction.
Figure 7:
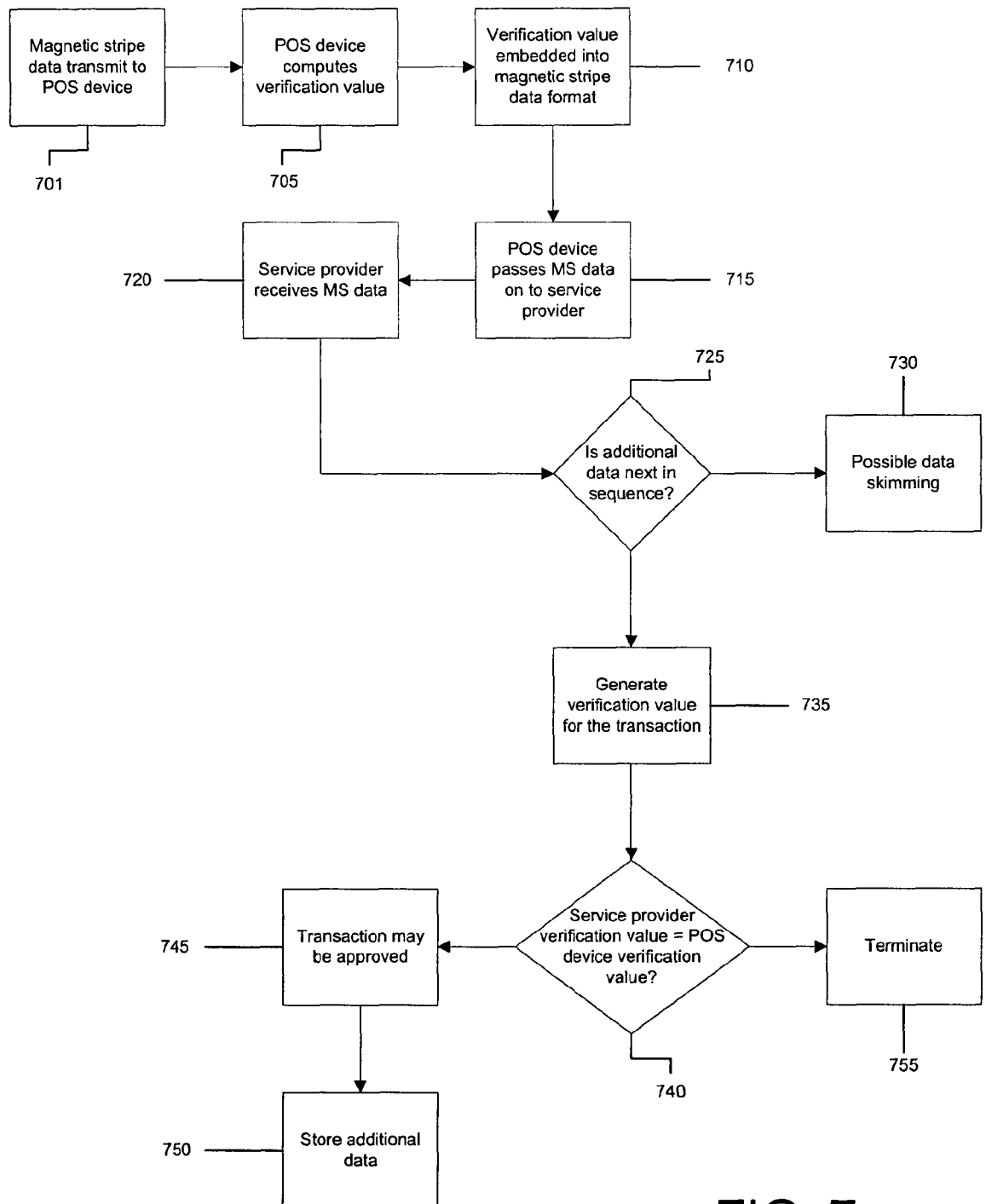
FIG. 7 is a flowchart of an alternate method of utilizing a dynamically created verification value to authenticate a transaction.

An important aspect of the present invention is that the system of utilizing the dynamically created CVV allows the service provider to make a determination of the authenticity of the payment service being utilized. This authentication step is not left to merchants, individual point of sale terminals, or other third parties or devices. FIG. 6 shows how the dCVV is used in a contactless environment to permit the service provider to evaluate the authenticity of the payment application deployed on the payment device to make a determination of whether the payment application has been skimmed. Although shown in the embodiment of a contactless environment in FIG. 6, the present invention is not limited to such an environment and may be used for any transaction where magnetic stripe Track 1 and/or Track 2 data is exchanged using any method or means for communicating such data. As shown in FIG. 6, the payment device generates the dCVV 601, preferably using the methodology described above. The dCVV is embedded into the payment data 605. In this respect, the exemplary record formats shown in FIG. 4 or FIG. 5 may be utilized. The payment data with the embedded dCVV is transmitted by data communication to the point of sale terminal 610. The point of sale terminal recognizes the received data as in the standard format of payment data and passes the data stream on to the service provider computer 615, likely via a payment network (not shown). The service provider computer receives 620 the payment data with the embedded dCVV and interrogates the appropriate indicator to determine if the transaction was a contactless transaction or not 625. If the service provider computer determines that the transaction was not a contactless transaction, the transaction is processed in its normal manner 630. If the service provider computer determines that the transaction was contactless, the service provider computer compares the ATC received from the payment device to the corresponding ATC stored on the service provider computer to determine if the received ATC is the expected next ATC 635. If the ATC received from the payment device is not the expected next ATC, the payment service deployed on the payment device has potentially been skimmed 640. If the expected next ATC is received, the service provider computer will independently re-generate the dCVV for the given transaction 645 utilizing the same process as described above. If the service provider generated dCVV matches the dCVV received from the payment device 650, the service provider deems the payment application to be authentic 655. The service provider computer then replaces the ATC which was previously stored on the service provider computer with the ATC received from the payment device 660 for subsequent authentications. If the service provider generated dCVV does not match the dCVV received from the payment device, the transaction is potentially fraudulent and is terminated 665.

The methodology of FIG. 6 discussed in conjunction with contactless transactions, is not limited thereto. For example, the methodology may be utilized with respect to transactions above a certain threshold value. In such an instance, the service provider, upon deploying the application, would configure the application to generate a dCVV for transactions above the threshold. The indicator interrogated in Step 625 would then be set for transactions above the threshold value. Similarly, the methodology may be utilized with respect to any other transaction criteria including, but not limited to, geographic location, use patterns, or any other criteria.

In an alternate embodiment, the payment device transmits payment data to a point of sale terminal such as a credit card terminal 701. The point of sale terminal receives the data and computes a verification value for the transaction 705. The verification value may be computed in a number of different ways including, without limitation, using a unique transaction number provided by the point of sale terminal, a timestamp, or a transaction amount added to a timestamp. The point of sale terminal may then embed and/or append the verification value and additional data to the payment data 710. The additional data may be required for the service provider computer to verify the transaction. The point of sale terminal then passes the data stream on to the service provider computer 715, likely via a payment network (not shown). The service provider computer receives the payment data with the verification value 720. The service provider computer may optionally compare at least a portion of the additional data embedded or appended by the point of sale terminal to corresponding data stored on the service provider computer to determine if the received data is proper 725. If the received data from the point of sale terminal is improper, the transaction data may potentially have been skimmed 730. If proper data is received, the service provider computer will independently re-generate the verification value for the given transaction utilizing the same process as used by the point of sale terminal 735. If the service provider generated verification value matches the verification value received from the point of sale terminal 740, the service provider deems the payment application to be authentic 745. The service provider computer may then optionally update the additional data which was previously stored on the service provider computer with the additional data received from the payment device for subsequent authentications 750. If the service provider generated verification value does not match the verification value received from the point of sale terminal, the transaction is potentially fraudulent and is terminated 755.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A method for authenticating a payment service being used in a transaction, the method comprising a plurality of steps, each being performed by hardware executing software, wherein the steps include:
generating on a payment device a first verification value unique to the transaction, wherein the verification value is generated by:
creating a base record comprising:
digits for an application transaction counter overlaying the left most digits of a primary account number corresponding to an account upon which the transaction is being conducted, wherein the application transaction counter is incremented for each said transaction; and
concatenated to the right most digits of the primary account number:
a card security code for the primary account number; and
an expiration date for the primary account number;
bisecting the base record into a first field and a second field;
encrypting the first field using a first encryption key;
performing an exclusive-OR (XOR) operation on the encrypted first field and the second field to produce a first result;
encrypting the first result using a second encryption key to produce a second result;
decrypting the second result using a decryption key to produce a third result;
encrypting the third result using a third encryption key to produce a fourth result;
sequentially extracting each value between 0 and 9 from the most-significant digit to the least-significant digit of the fourth result to produce a fifth result;
sequentially extracting and subtracting hexadecimal A from each value between hexadecimal A and hexadecimal F from the most-significant digit to the least-significant digit of the fourth result to produce a sixth result;
concatenating the fifth result and the sixth result to produce a seventh result; and
selecting one or more values from the seventh result as the first verification value;
communicating a payment record from the payment device to a point of sale terminal, wherein the payment record comprises the first verification value and payment data from the transaction;
communicating the payment record from the point of sale ten inal in a magnetic stripe data format to a service provider computer;
generating a second verification value on the service provider computer, wherein the second verification value is generated solely from data residing on the service provider computer; and
disapproving the transaction when the first verification value does not equal the second verification value.

2. The method as defined in claim 1, wherein the base record has a length of 128 bits.

3. The method as defined in claim 1, wherein the steps further comprise determining that a transaction amount for the transaction exceeds a predetermined threshold value prior to the generation of the verification value.

4. The method as defined in claim 1, wherein the steps further comprise determining, prior to the generating of the verification value, that a geographic location of the transaction corresponds to a predetermined geographic location.

5. The method as defined in claim 1, wherein:
the verification value is generated on the payment device;
the transaction is a payment transaction; and
the payment device is a mobile electronic device.

6. The method as defined in claim 5, wherein the communicating of the payment record from the mobile electronic device to the point of sale terminal comprises the mobile electronic device transmitting the payment record to the point of sale terminal via wireless communications.

7. The method as defined in claim 6, wherein the mobile electronic device is selected from the group consisting of an integrated circuit card, a smartcard, a memory card, a cellular telephone, a personal digital assistant, and a computer.

8. A method for authenticating a payment service being used in a transaction, the method comprising a plurality of steps, each being performed by hardware executing software, wherein the steps include:
generating, at a point of sale terminal, unique transaction data for the transaction being processed by the point of sale terminal;
sending, from the point of sale terminal in a wireless communication, the unique transaction data for the transaction;
receiving, at a mobile electronic device, the unique transaction data for the transaction;
creating, at the mobile electronic device, a base record comprising:
digits for an application transaction counter overlaying the left most digits of a primary account number corresponding to an account upon which the transaction is being conducted, wherein the application transaction counter is incremented for each said transaction; and
concatenated to the right most digits of the primary account number:
a card security code for the primary account number; and
an expiration date for the primary account number;
splitting, at the mobile electronic device, the base record into a first field and a second field;
encrypting, at the mobile electronic device, the first field using a first encryption key;
performing, at the mobile electronic device, an exclusive-OR (XOR) operation on the encrypted first field and the second field to produce a first result;
encrypting, at the mobile electronic device, the first result using a second encryption key to produce a second result;
decrypting, at the mobile electronic device, the second result using a decryption key to produce a third result;
encrypting, at the mobile electronic device, the third result using a third encryption key to produce a fourth result;
sequentially extracting, at the mobile electronic device, each value between 0 and 9 from the most-significant digit to the least-significant digit of the fourth result to produce a fifth result;
sequentially extracting and subtracting, at the mobile electronic device, hexadecimal A from each value between hexadecimal A and hexadecimal F from the most-significant digit to the least-significant digit of the fourth result to produce a sixth result;
concatenating, at the mobile electronic device, the fifth result and the sixth result to produce a seventh result; and selecting, at the mobile electronic device, one or more values from the seventh result as a first verification value;

sending, from the mobile electronic device, the first verification value;

receiving, at the point of sale terminal, the first verification value;

communicating the first verification value from the point of sale terminal to a service provider computer;

generating a second verification value on the service provider computer, wherein the second verification value is generated solely from data residing on the service provider computer; and disapproving the transaction when the first verification value does not equal the second verification value.

9. The method as defined in claim 8, wherein the base record has a length of 128 bits.

10. The method as defined in claim 8, wherein the steps further comprise determining that a transaction amount for the transaction exceeds a predetermined threshold value prior to the generation of the verification value.

11. The method as defined in claim 8, wherein the steps further comprise determining, prior to the generating of the verification value, that a geographic location of the transaction corresponds to a predetermined geographic location.

12. The method as defined in claim 8, wherein:
the verification value is generated on the payment device;
the transaction is a payment transaction; and
the payment device is a mobile electronic device.

13. The method as defined in claim 12, wherein the communicating of the payment record from the mobile electronic device to the point of sale terminal comprises the mobile electronic device transmitting the payment record to the point of sale terminal via wireless communications.

14. The method as defined in claim 12, wherein the mobile electronic device is selected from the group consisting of an integrated circuit card, a smartcard, a memory card, a cellular telephone, a personal digital assistant, and a computer.

15. A system for verifying a transaction comprising:
a first electronic device with a payment service deployed thereon;
a second electronic device in communication with the first electronic device, wherein the second electronic device receives a payment record from the first electronic device, the payment record comprising an account number for the payment service and a first verification value generated on the first electronic device by:
creating, at the first electronic device, a base record comprising:
digits for an application transaction counter overlaying the left most digits of a primary account number corresponding to an account upon which the transaction is being conducted, wherein the application transaction counter is incremented for each said transaction; and
concatenated to the right most digits of the primary account number:
a card security code for the primary account number; and
an expiration date for the primary account number;
splitting, at the first electronic device, the base record into a first field and a second field;
encrypting, at the first electronic device, the first field using a first encryption key;
performing, at the first electronic device, an exclusive-OR (XOR) operation on the encrypted first field and the second field to produce a first result;
encrypting, at the first electronic device, the first result using a second encryption key to produce a second result;
decrypting, at the first electronic device, the second result using a decryption key to produce a third result;
encrypting, at the first electronic device, the third result using a third encryption key to produce a fourth result;
sequentially extracting, at the first electronic device, each value between 0 and 9 from the most-significant digit to the least-significant digit of the fourth result to produce a fifth result;
sequentially extracting and subtracting, at the first electronic device, hexadecimal A from each value between hexadecimal A and hexadecimal F from the most-significant digit to the least-significant digit of the fourth result to produce a sixth result;
concatenating, at the first electronic device, the fifth result and the sixth result to produce a seventh result; and
selecting, at the first electronic device, one or more values from the seventh result as the first verification value;
and
a service provider system in communication with, and receiving the first verification value from, the second electronic device, wherein the service provider computer independently generates a second verification value and disapproves the transaction where the first verification value and the second verification value are not equal.

16. The system as defined in claim 15, wherein the first electronic device is selected from the group consisting of an integrated circuit card, a personal digital assistant, a cellular telephone, and a microprocessor with means for communicating with the second electronic device.

17. The system as defined in claim 15, wherein the first electronic device communicates with the second electronic device via a transmission medium selected from the group consisting of radio frequency waves, infrared frequency waves, and light waves.

* * * * *